United States Patent
Muroi

(10) Patent No.: US 7,106,015 B2
(45) Date of Patent: Sep. 12, 2006

(54) MOTOR CONTROL DEVICE AND MOTOR CONTROL METHOD

(75) Inventor: Kazushige Muroi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 9 days.

(21) Appl. No.: 11/064,933

(22) Filed: Feb. 25, 2005

(65) Prior Publication Data

US 2005/0189895 A1 Sep. 1, 2005

(30) Foreign Application Priority Data

Feb. 27, 2004 (JP) .............................. 2004-054215

(51) Int. Cl.
*H02P 3/14* (2006.01)
*H02P 3/18* (2006.01)

(52) U.S. Cl. ...................... 318/376; 318/560; 318/445; 347/37; 347/101

(58) Field of Classification Search ........ 318/370–379, 318/445, 446, 560, 561; 347/37, 101
See application file for complete search history.

(56) References Cited

U.S. PATENT DOCUMENTS

| 4,226,546 | A | * | 10/1980 | Hoffman ................... 400/144.2 |
| 5,258,773 | A | * | 11/1993 | Arakawa et al. ............... 347/37 |
| 6,181,098 | B1 | * | 1/2001 | Murakami .................... 318/603 |
| 6,418,274 | B1 | * | 7/2002 | Tanaka ........................ 388/800 |
| 6,483,270 | B1 | * | 11/2002 | Miyazaki et al. ............ 318/700 |
| 6,538,407 | B1 | * | 3/2003 | Tanaka ........................ 318/445 |
| 6,600,286 | B1 | * | 7/2003 | Tanaka et al. ............... 318/560 |
| 6,756,760 | B1 | * | 6/2004 | Tanaka et al. ............... 318/560 |
| 6,930,458 | B1 | * | 8/2005 | Akiyama et al. ........... 318/376 |
| 2001/0024101 | A1 | * | 9/2001 | Tanaka ........................ 318/800 |
| 2001/0028231 | A1 | * | 10/2001 | Tanaka ........................ 318/445 |
| 2001/0035724 | A1 | * | 11/2001 | Tanaka et al. .............. 318/445 |
| 2002/0021102 | A1 | * | 2/2002 | Kurashina ................... 318/685 |
| 2002/0039119 | A1 | * | 4/2002 | Igarashi ......................... 347/16 |
| 2002/0163568 | A1 | * | 11/2002 | Takeishi ..................... 347/101 |
| 2003/0063325 | A1 | * | 4/2003 | Takahashi ................... 358/420 |
| 2003/0067507 | A1 | * | 4/2003 | Anzai ........................... 347/37 |
| 2003/0151380 | A1 | * | 8/2003 | Akiyama et al. ........... 318/376 |
| 2003/0178958 | A1 | * | 9/2003 | Akiyama ..................... 318/280 |
| 2003/0205982 | A1 | * | 11/2003 | Tanaka et al. .............. 318/560 |
| 2005/0057200 | A1 | * | 3/2005 | Akiyama ....................... 318/66 |
| 2005/0189895 | A1 | * | 9/2005 | Muroi ......................... 318/376 |
| 2005/0189898 | A1 | * | 9/2005 | Muroi ......................... 318/560 |
| 2006/0008310 | A1 | * | 1/2006 | Morikawa et al. .......... 400/283 |

FOREIGN PATENT DOCUMENTS

JP          57-43888          3/1982

* cited by examiner

*Primary Examiner*—Paul Ip
(74) *Attorney, Agent, or Firm*—Banner & Witcoff, Ltd.

(57) ABSTRACT

If a traveling speed of a carriage calculated by a speed converter is larger than an estimated speed in a deceleration section, braking is conducted by a braking method corresponding to a manipulated variable generated by a drive control unit. Owing to this type of braking, the traveling speed is reduced to the estimated speed. At this time, braking is conducted corresponding to an error between a target speed and the traveling speed, or an error between a speed (corresponding to an error between a current position of the carriage and a target stop position) and the traveling speed. Therefore, even if a braking force required for braking differs depending on individual variability of the carriage control device or operative condition of the carriage, braking can be conducted with a suitable braking force.

20 Claims, 9 Drawing Sheets

MOTOR CONTROL DEVICE AND MOTOR CONTROL METHOD

BACKGROUND OF THE INVENTION (1) Field of Invention

This invention relates to a device and a method for controlling motor operation.

(2) Background Art

In order to conduct recording with a printer wherein a carriage runs across a recording medium, it is necessary to accelerate the carriage up to specific speed, and after moving the carriage across a section above the recording medium at the specific speed, the carriage needs to be promptly decelerated so as to stop at a predetermined target stop position, that is a position wherein minimum acceleration distance for return movement is maintained. Alternatively, the carriage needs to be decelerated so as to stop at a position located slightly further than the target stop position and besides a nearest possible position to an onset of a permissible section for stoppage.

Simply by reducing rotational speed of a motor that drives the carriage after the carriage enters a deceleration section, the traveling speed of the carriage may not be sufficiently lowered due to inertia. For this reason, combinations of braking methods, such as regenerative braking, reverse rotation braking (plugging) and short-circuit braking, have been conventionally used to stop a carriage at a target stop position or at a nearest possible position to an onset of a permissible section for stoppage, that is slightly further than the target stop position.

In the case where the traveling speed of the carriage is reduced by this braking method, the traveling speed of the carriage may be reduced more than necessary due to braking effect, and the carriage may stop before reaching the target stop position (that is, the carriage may undershoot). Nevertheless, a motor is controlled in a manner so that the carriage initiates moving again from the position where the carriage has stopped, and the carriage eventually reaches the target stop position. In respect of the movement of the carriage, there is no problem with this operation. However, time required for the carriage to reach the target stop position becomes long, since the carriage stops once and then initiates the movement again.

In order to solve this problem, Japanese Unexamined Publication No. 57-43888 discloses a technique wherein the traveling speed of the carriage is once reduced from a normal traveling speed (a steady speed v1) to a constant speed (a low speed v2) by braking the carriage, when the carriage (carrier) enters a deceleration section. After moving the carriage for a predetermined distance (up to a predetermined position P) at the reduced speed (v2), braking is again conducted to reliably stop the plant (carrier).

SUMMARY OF THE INVENTION

According to the above-described technique, when the carriage enters the deceleration section, it is necessary to reduce the traveling speed of the carriage by the first braking to an extent so that the carriage is reliably stopped by the next braking. However, the braking force to the carriage may work differently depending on individual variability in a carriage drive mechanism or operative condition thereof. It is expected that a control pattern for reducing the traveling speed needs to be finely adjusted corresponding to the variability and condition.

JP57-43888 does not disclose or indicate the difference in braking force to the carriage caused by the individual variability in the carriage or the operative condition thereof. It is presumed that braking is conducted in a uniform pattern (with a specific braking force). Accordingly, it is possible that time required for the traveling speed to be reduced to the specific speed (the low speed v2) might become long depending on the conditions, and consequently time required for the carriage to reach a stop position becomes long.

The present invention was made to solve the above and other issues, and one object of the present invention is to provide a technique that can inhibit time required for a carriage to reach a stop position from becoming long.

A motor control device of the present invention comprises: a motor that drives a plant; a detector that detects at least one operation value that indicates an operational state of the plant; and a controller that determines a manipulated variable corresponding to an error between the operation value detected by the detector and a given direction value. The motor control device controls operation of the motor based on the manipulated variable determined by the controller. The motor control device furthermore comprises a braking device that brakes the plant corresponding to the error between the operation value and the direction value, when the operation value detected by the detector is larger than an estimated value estimated as a predetermined operation value in a deceleration section which continues to a target stop position until the plant is stopped.

The estimated value is a predetermined operation value in the deceleration section. After the plant enters the deceleration section, the operation value of the plant is reduced to the estimated value by conducting the above-described braking by the braking device. This braking on the plant is conducted corresponding to the error between the operation value and the direction value. Therefore, even if a braking force required for conducting the braking on the plant differs depending on conditions, such as individual variability of the motor control device or a operational condition of the plant, braking on the plant can be conducted with a braking force suitable for the conditions.

Reducing the operation value of the plant once to the estimated value can inhibit the plant from stopping before reaching the target stop position. Moreover, since braking can be conducted in a pattern (with a braking force) suitable for conditions when the operation value is reduced to the estimated value, time for the operation value to reach the estimated value can be relatively shortened. Accordingly, it is possible to inhibit time required for the plant to reach the target stop position from becoming long.

The detector may be constituted, for example, to detect at least one of a traveling speed and a current position of the plant as the operation value based on a count value of an encoder signal outputted from a rotary encoder or a linear encoder corresponding to the operation of the plant or the motor.

The direction value given to the controller may indicate a traveling speed at which the plant should be moved.

The above-described braking device can be constituted, for example, to brake the plant by a braking method based on a manipulated variable determined by the controller corresponding to the error between the operation value and the direction value, when the operation value is larger than the estimated value.

With the above-described constitution, when the operation value is larger than the estimated value, that is, before the operation value reaches the estimated value, the plant can be braked by the control method defined based on the manipulated variable determined by the controller corresponding to the error between the operation value and the direction value.

More specifically, the braking device can be constituted as follows: when the operation value is larger than the estimated value, and if a controlled variable corresponding to the manipulated variable determined by the controller is "0", the braking device may conduct braking on the plant by a predetermined first braking method; if the controlled variable corresponding to the manipulated variable determined by the controller is negative, the braking device can conduct braking on the plant by a second braking method that provides a larger braking force than a braking force provided by the first braking method.

With the above constitution, braking on the plant can be conducted with different braking forces corresponding to the manipulated variable determined by the controller until the operation value reaches the estimated value. For example, when the controlled variable corresponding to the manipulated variable determined by the controller is "0", that is, when it is not necessary to drive the plant, the braking device can be constituted to conduct braking on the plant by the first braking method that provides a small braking force only sufficient to restrain traveling of the plant by inertia. When the controlled variable corresponding to the manipulated variable determined by the controller is negative, that is, when driving of the plant is required in order to suppress traveling of the plant, the braking device can be constituted to conduct braking on the plant by the second braking method that provides a large braking force sufficient to drive the plant in a reverse direction.

The first and the second braking methods in the above-described constitution are not limited to specific methods as long as the second braking method provides a larger braking force than a braking force provided by the first braking method. Regenerative braking, for example, can be used for the first braking method. Reverse rotation braking (plugging) and/or short-circuit braking (dynamic braking) that provide a larger braking force can be used for the second braking method.

A braking pattern by the braking device to stop the plant at the target stop position in the deceleration section after the operation value reaches the estimated value is not limited to a specific pattern. It is, for example, possible to adopt a pattern wherein a predetermined braking method is conducted to stop the plant at the target stop position when the plant reaches the target stop position.

For the above-described braking pattern, the braking device can be constituted to conduct braking on the plant by a third braking method suitable to stop the operation of the plant if the operational state indicated with the operation value detected by the detector indicates that the plant has reached the target stop position.

With the above-described constitution, when the plant reaches the target stop position, the plant can be stopped by the third braking method.

For the third braking method, it is possible, for example, to use short-circuit braking (dynamic braking).

In another aspect of the present invention, there is provided a motor control method comprising steps of: detecting at least one operation value indicating an operational state of a plant driven by a motor; determining a manipulated variable based on an error between the operation value and a direction value; and conducting a braking on the plant according to an error between the operation value and the direction value, when the operation value indicating the operational state of the plant is larger than an estimated value estimated as a predetermined operation value in a deceleration section which continues to a target stop position until the plant is stopped.

BRIEF DESCRIPTION OF THE DRAWINGS

The invention will now be described below, by way of example, with reference to the accompanying drawings, in which.

DETAILED DESCRIPTION OF THE PREFERRED EMBODIMENT

Figure 1:
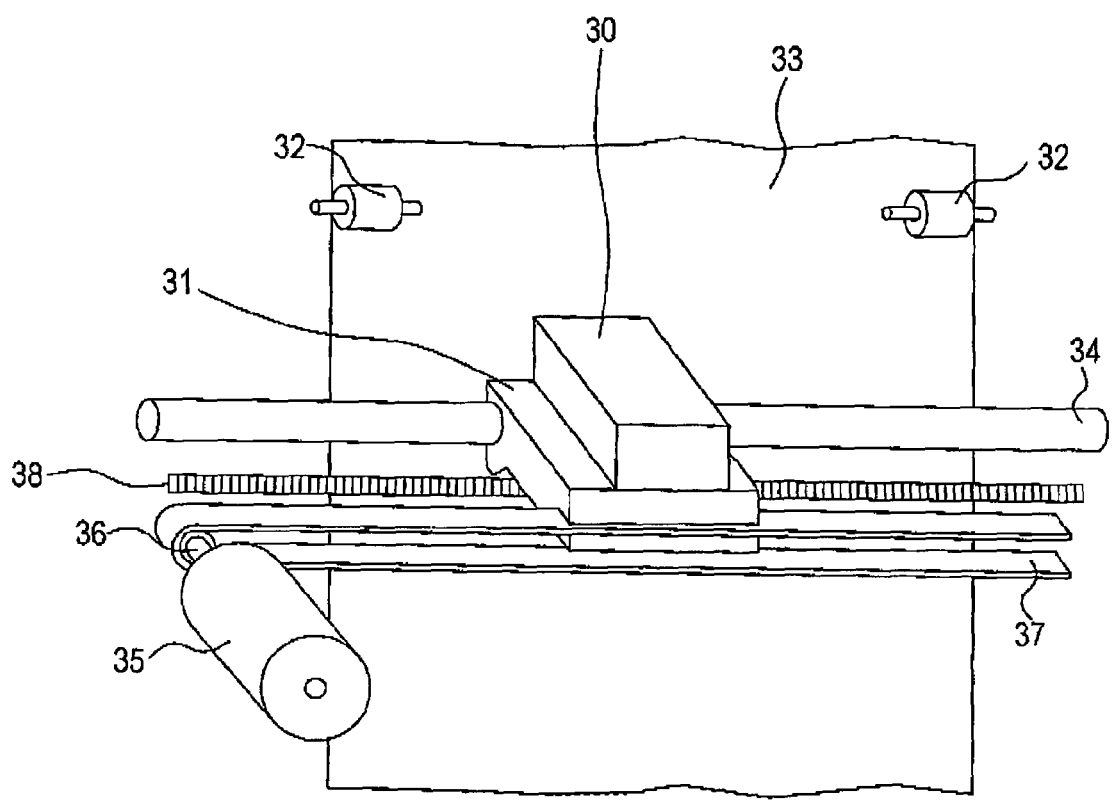
FIG. 1 is a structural diagram showing a schematic structure of a carriage drive mechanism of an embodiment according to the present invention.

An ink jet printer (hereafter, referred to as a "printer") comprises a carriage driving mechanism. In the carriage driving mechanism shown in FIG. 1, a record head 30 mounted on a carriage 31 performs recording by ejecting an ink toward a printing sheet 33 from a nozzle. The printing sheet 33 is conveyed by paper holding rollers 32. A guide shaft 34 is provided in a width direction of the printing sheet 33. The carriage 31 is slidably supported by the guide shaft 34.

A control motor (CR motor) 35 is provided on one end of the guide shaft 34. Between a pulley 36 of the CR motor 35 and an idle pulley (not shown) provided on the other end of the guide shaft 34, an endless belt 37 is held along the guide shaft 34. The carriage 31 is connected to the endless belt 37. That is, the carriage 31 is designed to move back and forth in a width direction of the printing sheet 33 along the guide shaft 34 by a driving force of the CR motor 35 transmitted via the endless belt 37.

A timing slit 38 is provided below and along the guide shaft 34. Slits having a certain interval therebetween (1/150 inches=approximately 0.17 mm, in the present embodiment) are formed on the timing slit 38.

A detector (not shown) is provided in a lower part of the carriage 31. The detector is composed of a photo interrupter in which a light emitting element and a light receiving element are arranged to face each other. The timing slit 38 is positioned between the light emitting element and the light receiving element. The detector and the timing slit 38 together constitute a later-explained linear encoder 39 (see FIG. 4).

Figure 2:
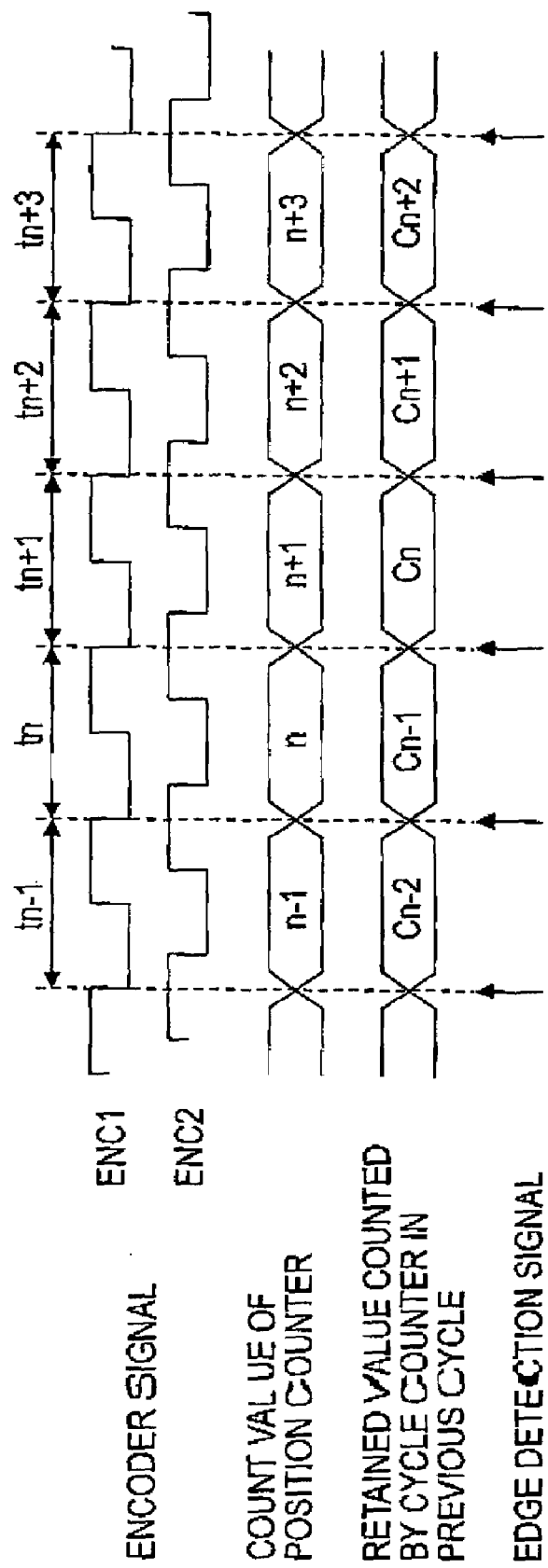
FIG. 2 is an explanatory view showing an output pattern of encoder signals in the embodiment.

As shown in FIG. 2, the detector outputs two types of encoder signal, ENC1 and ENC 2. The phase of ENC1 and the phase of ENC2 are shifted by a predetermined cycle (¼ cycles, in the present embodiment). When the carriage 31 is moved in a forward direction, that is, from the home position (the left end position in FIG. 1) to the side of the idle pulley, the phase of ENC1 is advanced ahead of the phase of ENC2 by the predetermined cycle. When the carriage is moved in a reverse direction, that is, from the side of the idle pulley to the home position, the phase of ENC1 is delayed from the phase of ENC2 by the predetermined cycle.

Figure 3:
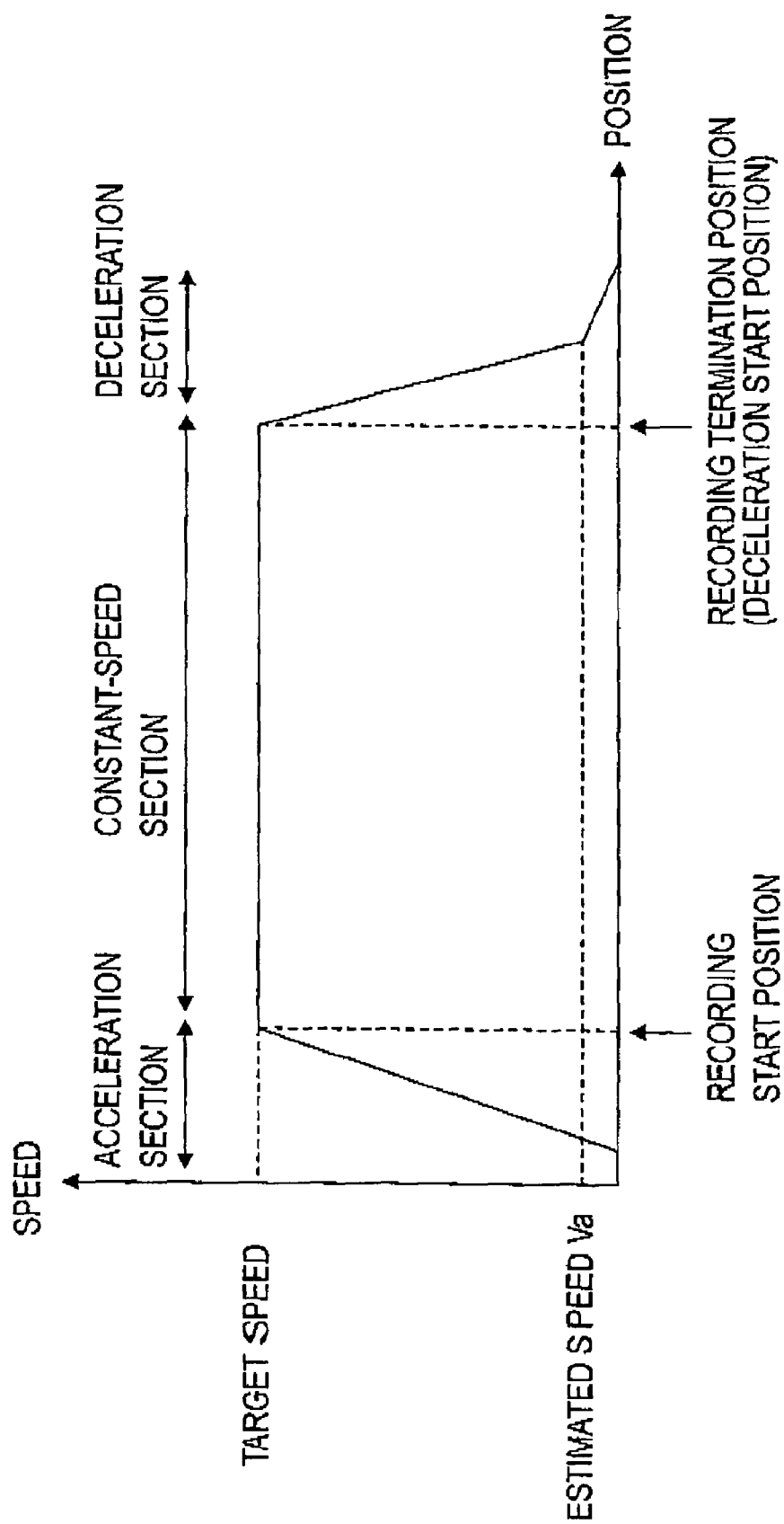
FIG. 3 is an explanatory view showing a traveling state of a carriage of the embodiment.

In the above carriage driving mechanism, when a recording process is not performed, the carriage 31 stands by at the home position set near the side end of the pulley 36 of the guide shaft 34 or a position where the last recording has ended (hereafter, the position from which the carriage 31 is started to be moved is referred to as an "original position"). When the recording process is started, as shown in FIG. 3, the carriage 31 is accelerated so as to reach a target speed before reaching a predetermined recording start position. Then, the carriage 31 is moved at a certain target speed till it reaches a predetermined recording termination position. After passing the recording termination position, the carriage 31 is decelerated until it stops. Hereafter, a section from the original position to the recording start position is referred to as an acceleration section. A section from the recording start position to the recording termination position is referred to as a constant-speed section. A section from the recording termination position to where the carriage 31 stops is referred to as a deceleration section.

Figure 4:
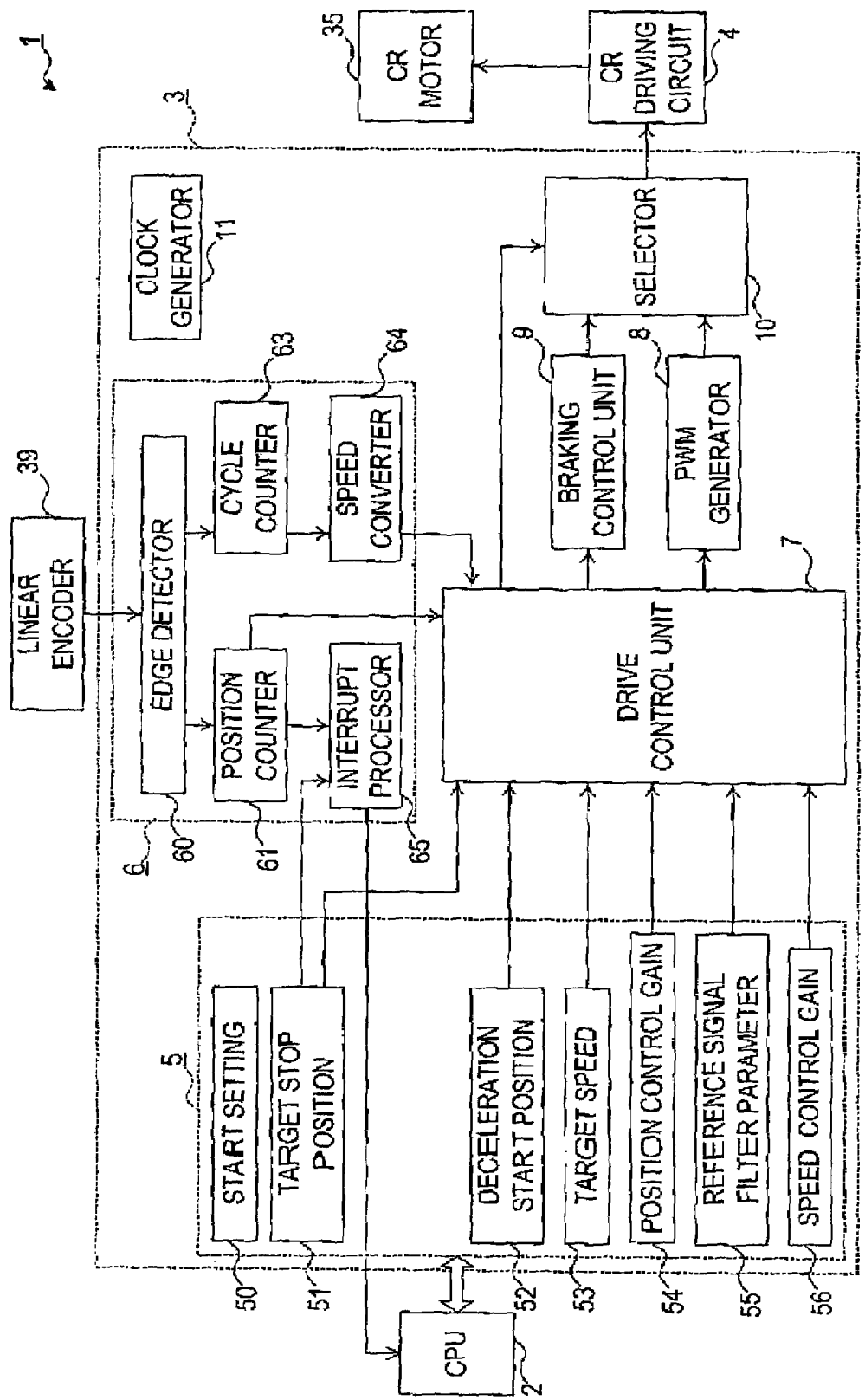
FIG. 4 is a block diagram showing a structure of a carriage control device of the embodiment.

As shown in FIG. 4, a carriage control device 1 is provided in the printer of the present embodiment. The carriage control device 1 comprises: a CPU 2 that generally controls the printer; an ASIC (Application Specific Integrated Circuit) 3 that generates a PWM (Pulse Width Modulation) signal for controlling a rotational speed and a direction of the CR motor 35; and a motor driving circuit (CR driving circuit) 4 that drives the CR motor 35 based on the PWM signal generated by the ASIC 3 or a braking signal.

The ASIC 3 comprises: registers 5 that store various parameters used for controlling the CR motor 35; a carriage positioning measurer 6 that calculates a position and a traveling speed of the carriage 31 according to the encoder signals ENC1 and ENC2 taken from the linear encoder 39; a drive control unit 7 that generates a manipulated variable for controlling the CR motor 35 and driving the carriage 31; a PWM generator 8 that generates a PWM signal with a duty ratio corresponding to the manipulated variable generated by the drive control unit 7; a braking control unit 9 that generates a braking signal to control the CR motor 35 and to brake (decelerate) the carriage 31; a selector 10 that selectively outputs the PWM signal generated by the PWM generator 8 or the braking signal generated by the braking control unit 9 to the motor driving circuit 4 according to a procedure to be described later; and a clock generator 11 that supplies a clock signal having a cycle sufficiently shorter than the cycle of the encoder signals ENC1 and ENC2 to each part in the ASIC 3.

The registers 5 include: a start setting register 50 that is used to start the CR motor 35; a target stop position setting register 51 that is used to set a target stop position where the carriage 31 should stop; a deceleration start position setting register 52 that is used to set a deceleration start position (the same position as the recording termination position) where the deceleration of the carriage 31 is started; a target speed setting register 53 that is used to set a target speed of the carriage 31; a position control gain setting register 54 that is used to set a position control gain used for a feedback calculation at the time of controlling the CR motor 35 and driving the carriage 31; a reference signal filter parameter setting register 55 that is used to set a parameter for a later-explained reference signal filter; and a speed control gain setting register 56 that is used to set a speed control gain used for a feedback calculation at the time of controlling the CR motor 35 and driving the carriage 31. The aforementioned "deceleration start position" does not only mean the position where the deceleration is started, but the position at least to which the carriage 31 should maintain the target speed. In other words, after the carriage 31 has reached the position, the deceleration can be started.

Figure 5:
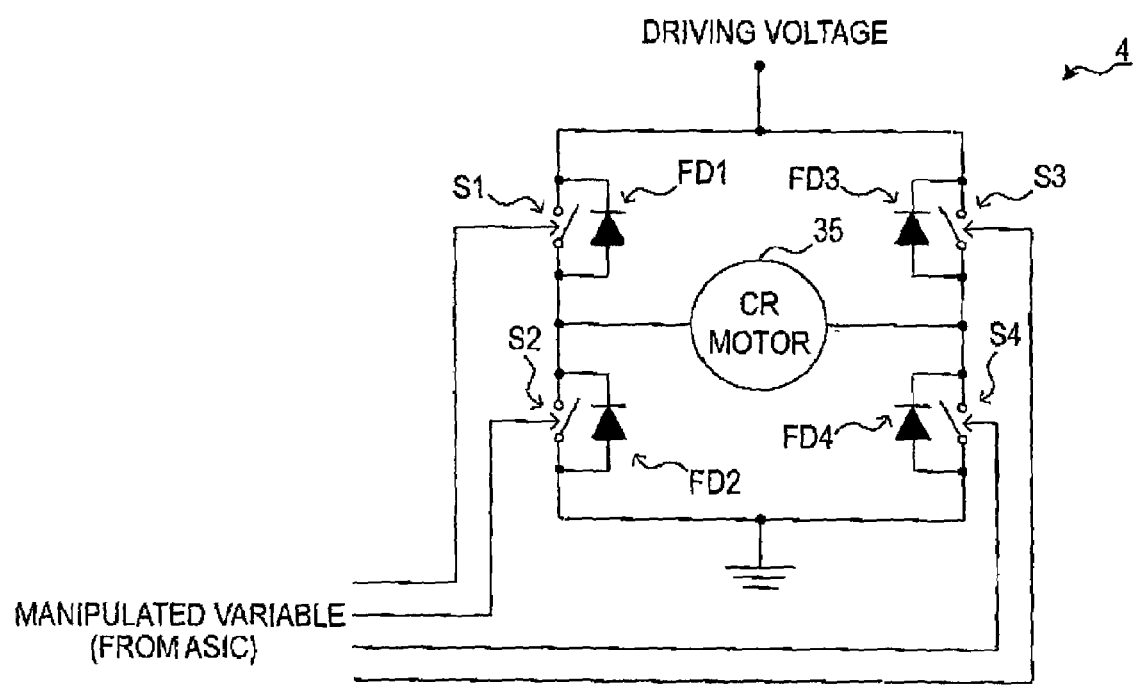
FIG. 5 is a circuit diagram showing a structure of a motor drive circuit of the embodiment.

As shown in FIG. 5, the motor driving circuit 4 comprises an H-bridge circuit constituted with four switching elements S1 to S4 (e.g. elements including FET (Field-Effect Transistor)) and flywheel diodes FD1 to FD4 respectively connected in parallel to the respective switching elements S1 to S4. The motor driving circuit 4 controls power distribution to the CR motor 35 by switching on/off the switching elements S1 to S4 corresponding to an external signal (the PWM signal, the braking signal). For example, by switching on/off the switching elements S1 and S4 with a specific duty ratio, the CR motor 35 can be driven with regular rotation and the carriage 31 can be moved (scanned) in one direction. Alternatively, by switching on/off the switching elements S2 and S3 with a specific duty ratio, the CR motor 35 can be driven with reverse rotation and the carriage 31 can be moved (scanned) in the other direction.

The carriage positioning measurer 6 includes an edge detector 60, a position counter 61, a cycle counter 63, a speed converter 64, and an interrupt processor 65. The edge detector 60 detects an edge detection signal indicating the initiation/termination of each cycle of the encoder signals ENC1 (an edge of ENC1 when the level of ENC2 is high, in the present embodiment) based on the encoder signals ENC1 and ENC2 from the linear encoder 39. The edge detector 60 also detects a rotational direction of the CR motor 35 (a forward direction when the edge detection signal indicates a trailing edge of ENC1, and a reverse direction when the edge detection signal indicates a leading edge of ENC1). The position counter 61 detects a position of the carriage 31 in relation with a slit on the timing slit 38 by incrementing (when the rotational direction of the CR motor 35 is the forward direction) or decrementing (when the rotational direction of the CR motor 35 is the reverse direction) the number of the edge detection signal according to the rotational direction of the CR motor 35 (i.e. the traveling direction of the carriage 31) detected by the edge detector 60. The cycle counter 63 counts an interval at which the edge detection signal from the edge detector 60 is generated by counting a clock signal. The speed converter 64 calculates the traveling speed of the carriage 31 based on a distance between the slits on the timing slit 38 ($\frac{1}{150}$ inch) and time $t_{n-1}$ ($=C_{n-1} \times$ clock cycle period) specified from a retained value $C_{n-1}$ which is a value counted by the cycle counter 63 in the previous cycle of the encoder signal ENC1. The interrupt processor 65 outputs a stop interrupt signal to the CPU 3 corresponding to the count value in the position counter 61. The output of the stop interrupt signal by the interrupt processor 65 is conducted when the count value by the position counter 61 is equal to or larger than a count value indicating the carriage 31 is located on the target stop position set in the target stop position setting register 51.

Figure 6:
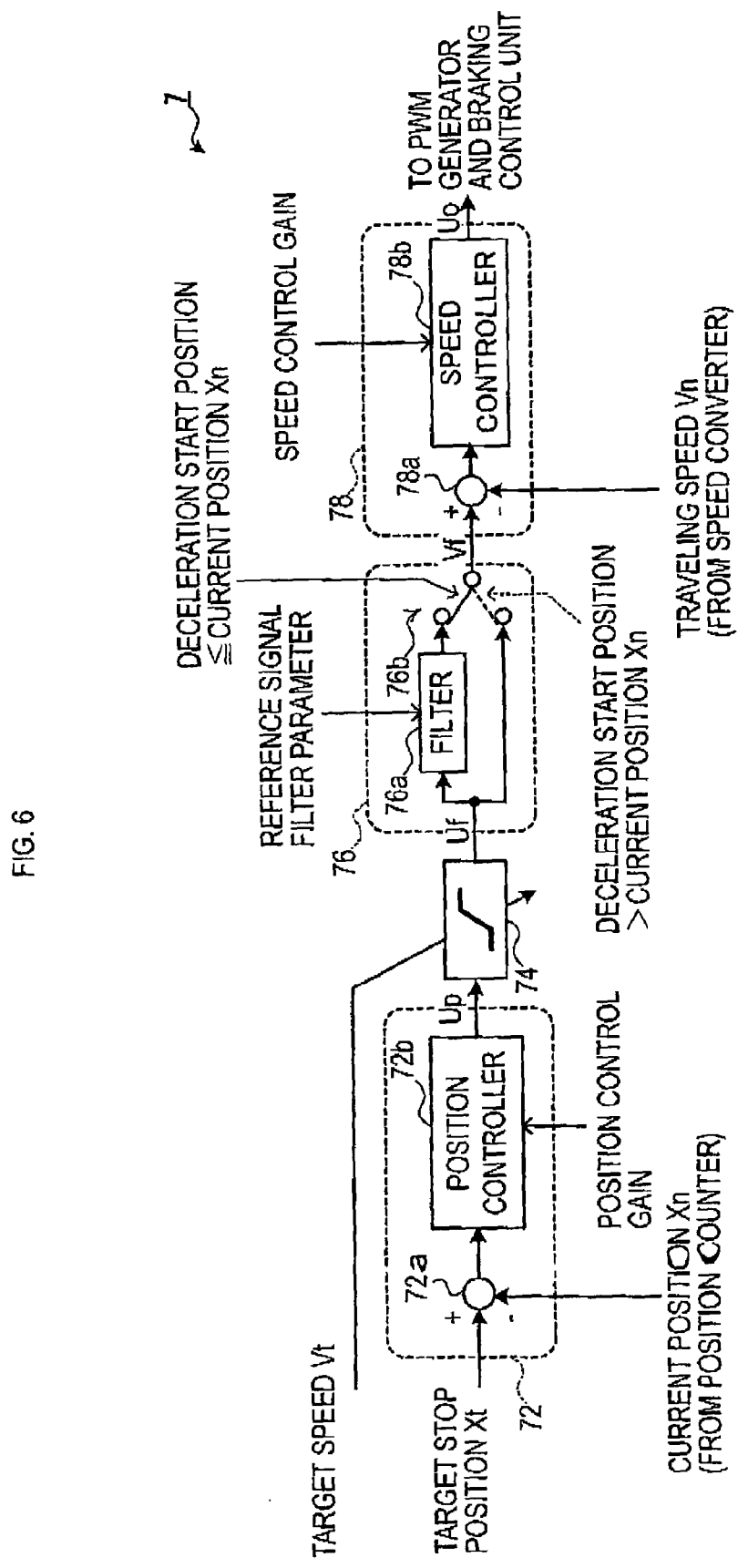
FIG. 6 is a block diagram showing a structure of a drive control unit of the embodiment.

As shown in FIG. 6, the drive control unit 7 comprises a position controller 72, a speed direction corrector 74, a reference signal filter 76, and a speed controller 78. The position controller 72 generates a manipulated variable by a proportional control (P control) based on an error between the target stop position set in the target stop position setting register 51 and the current position of the carriage 31 defined by the count value in the position counter 61. The speed direction corrector 74 corrects the target speed set in the target speed setting register 53 based on the manipulated variable obtained from the position controller 72. The reference signal filter 76 moderates an abrupt change in the target speed corrected by the speed direction corrector 74; and the speed controller 78 generates the manipulated variable by a PID (Proportional-Integral-Derivative) control based on an error between the target speed processed in the reference signal filter 76 and the traveling speed of the carriage 31 calculated by the speed converter 64.

The speed direction corrector 74 corrects the target speed to the speed corresponding to the manipulated variable from the position controller 72 only when the speed corresponding to the manipulated variable from the position controller 72 is lower than the target speed set in the target speed setting register 53. In other words, the speed direction corrector 74 saturates the manipulated variable from the position controller 72 with the manipulated variable corresponding to the target speed set in the target speed setting register 53.

The reference signal filter 76 is provided with a path connecting to a filter 76a, which delays the manipulated variable corresponding to the target speed corrected by the speed direction corrector 74, and a path not connecting to the filter 76a, which does not delay the aforementioned manipulated variable. The reference signal filter 76 is capable of switching the paths by means of a switch 76b. The filter 76a has a property of outputting the change in the manipulated variable corresponding to the target speed corrected by the speed direction corrector 74 in a delayed manner, based on a reference signal filter parameter set in the reference signal filter parameter setting register 55. The switch 76b is designed to be switched to the path connecting to the filter 76a only when the current position of the carriage 31 defined by the count value of the position counter 61 is smaller than the deceleration start position set in the deceleration start position setting register 52, that is, until the carriage 31 passes the deceleration start position. It is to be noted that the drive control unit 7 outputs a control switching signal to the selector 10 at the time of initiating the deceleration of the carriage 31 when the carriage 31 is moved further than the deceleration start position set in the deceleration start position setting register 52. Based on the control switching signal, the selector 10 selectively supplies the manipulated variable outputted from the braking control unit 9 or the PWM generator 8 to the motor driving circuit 4 by a procedure to be described later.

The braking control unit 9 is designed to generate a plurality of signals by which a predetermined combination of the switching elements S1 to S4 in the H-bridge circuit of the motor driving circuit 4 can be switched on, and to output the plurality of signals to the selector 10 as the braking signal to brake the carriage 31.

Specifically, first, the braking control unit 9 generates signals to switch off all the switching elements of the motor driving circuit 4 as the braking signal for conducting regenerative braking (regenerative braking signal). For example, in the case where the CR motor 35 is rotated in a forward direction by switching on/off the switching elements S1 and S4 of the motor driving circuit 4, when the regenerative braking signal is inputted into the motor driving circuit 4 via the selector 10 (that is, when input of signals into the motor driving circuit 4 stops), all the switching elements of the motor driving circuit 4 are tuned off, and a regenerative electric current flows via the flywheel diodes FD1 and FD4. The rotational speed of the CR motor 35 is then reduced. Correspondingly the carriage 31 is braked (see FIG. 5). Alternatively, in the case where the CR motor 35 is rotated in a reverse direction by switching on/off the switching elements S2 and S3 of the motor driving circuit 4, when the regenerative braking signal is inputted into the motor driving circuit 4 via the selector 10, a regenerative electric current flows via the flywheel diodes FD2 and FD3. The rotational speed of the CR motor 35 is then reduced. Correspondingly the carriage 31 is braked (see FIG. 5).

Second, the braking control unit 9 generates signals to switch on only the switching elements S2 and S3 or signals to switch on only the switching elements S1 and S4 as the braking signal to conduct reverse rotation braking (reverse rotation braking signal). For example, in the case where the CR motor 35 is rotated in a forward direction by switching on/off of the switching elements S1 and S4, when the reverse rotation braking signal to switch on only the switching elements S2 and S3 are inputted into the motor driving circuit 4 via the selector 10, only the switching elements S2 and S3 of the motor driving circuit 4 are switched on. Consequently, a drive electric current flows in a reverse direction via the switching elements S2 and S3, the rotational speed of the CR motor 35 is reduced, and correspondingly the carriage 31 is braked. Similarly, in the case where the CR motor 35 is rotated in a reverse direction by switching on/off the switching elements S2 and S3 of the motor driving circuit 4, when the reverse rotation braking signal to switch on only the switching elements S1 and S4 is inputted into the motor driving circuit 4 via the selector 10, the carriage 31 can be braked corresponding to the deceleration of the CR motor 35 (see FIG. 5).

Third, the braking control unit 9 generates signals to switch on only the switching elements S2 and S4 of the motor driving circuit 4 as the braking signal (short-circuit braking signal) for conducting short-circuit braking (or dynamic braking). That is, for short-circuit braking (dynamic braking), in both cases where the CR motor 35 is driven in a forward direction by switching on/off the switching elements S1 and S4 of the motor driving circuit 4, and where the CR motor 35 is driven in a reverse direction by switching on/off the switching elements S2 and S3, when the short-circuit braking signal to switch on only the switching elements S2 and S4 is inputted into the motor driving circuit 4 via the Selector 10, only the switching elements S2 and S4 of the motor driving circuit 4 are switched on. In this state, by the switching elements S2 and S4, and the flywheel diodes FD2 and FD4 connected thereto in parallel, the CR motor 35 is short-circuited. Then, the rotational speed of the CR motor 35 is reduced by a flow of an electric current generated by the CR motor 35, and the carriage 31 is braked (see FIG. 5). Short-circuit signals used to conduct the short-circuit braking (dynamic braking) are not limited to the short-circuit braking signal to switch on only the switching elements S2 and S4, but the short-circuit braking signal to switch on the switching elements S1 and S3 can be also used. Moreover, it is not always necessary to switch on two switching elements S2 and S4 (or S1 and S3) for conducting short-circuit braking. It is also possible to conduct the short-circuit braking with a short-circuit braking signal that switches on only one of the switching elements S2 and S3 during the forward driving, or with a short-circuit braking signal that switches on only one of the switching elements S4 and S1 during the reverse driving. In such cases, a generated electric current is supplied only to the flywheel diodes connected in parallel to the switching elements that are in an off state.

Figure 7:
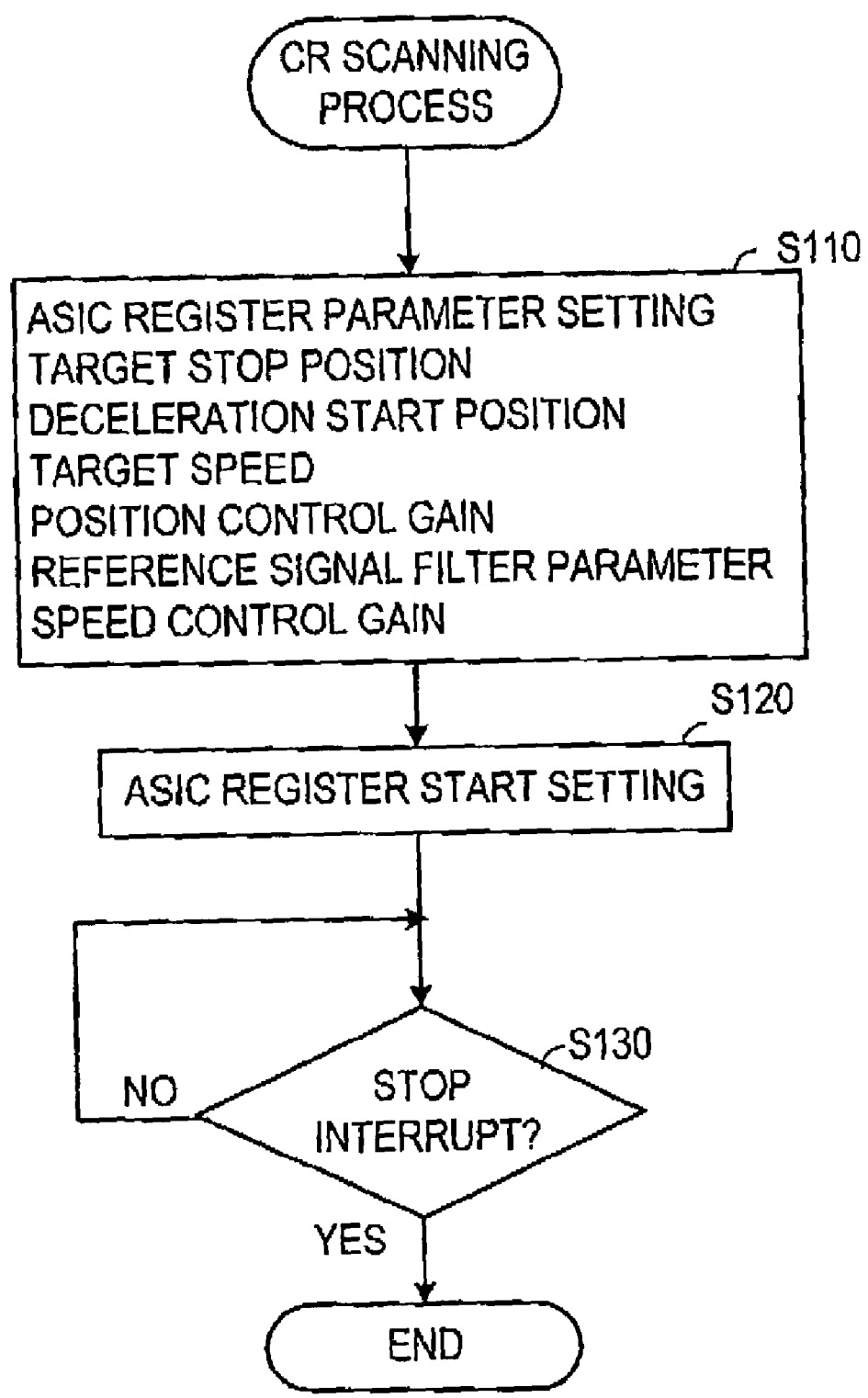
FIG. 7 is a flowchart showing a control (CR) scanning process executed by a CPU of the embodiment.

From now on, explanation on a CR scanning process performed by the CPU 2 is given by way of FIG. 7.

When the CR scanning process is started, the CPU 2 initializes the target stop position, deceleration start position, target speed, position control gain, reference signal filter parameter, and speed control gain in the respective registers of the registers 5 in the ASIC 3 (S110). A gain Kp, that can be obtained from a traveling speed Vt of the plant, a deceleration start position Xd, and a target stop position Xt (Kp≧Vt/(Xt−Xd)), is set to the position control gain in the position control gain setting register 54 as a gain in a proportional control. The gain Kp is a parameter predetermined so that the carriage 31 does not start being decelerated before reaching the deceleration start position Xd.

Subsequently, data is written to the start setting register 50 so that the respective parts in the ASIC 3 can be started (S120). In this manner, after the ASIC 3 is started, the drive control unit 7 repeatedly generates a control signal following the later-explained steps. The control signal is sequentially inputted to the CR driving circuit 4 via the PWM generator 8 so that the carriage 31 is moved by the CR motor 35. Later, when the carriage 31 is moved to the target stop position, a stop interrupt signal is outputted from the interrupt processor 65.

The CPU 2 stands by until the stop interrupt signal is inputted from (the interrupt processor 65 of) the ASIC 3 (S130: NO). When the stop interrupt signal is inputted (S130: YES), the process is ended.

Figure 8:
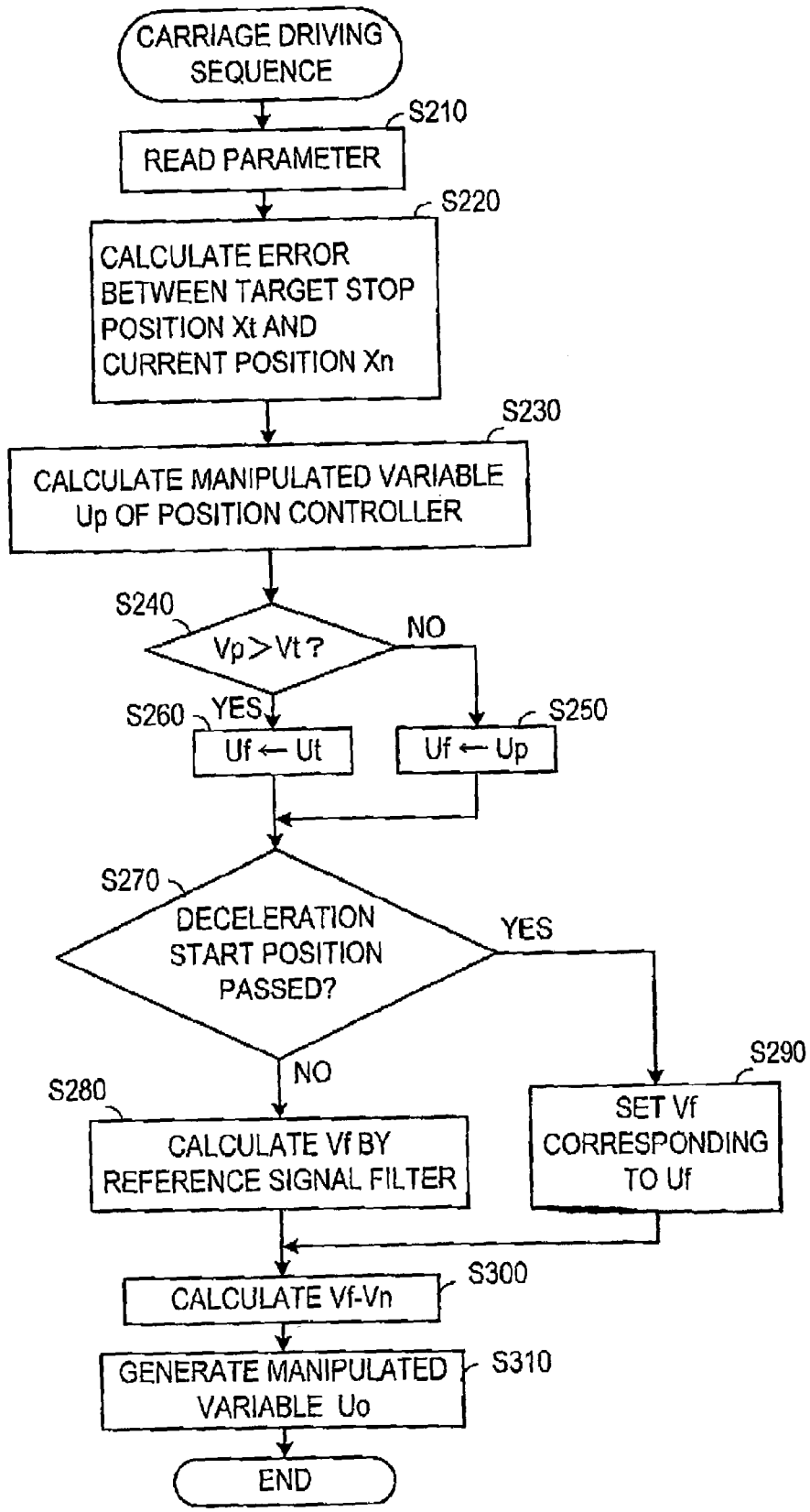
FIG. 8 is a flowchart showing steps in a carriage drive sequence of the embodiment.

Now, steps in which the drive control unit 7 of the ASIC 3 generates the control signal, when and after the ASIC 3 is started by the CR scanning process by the CPU 2, is explained by way of FIG. 8. The drive control unit 7 is configured as a so-called hardware circuit so as to perform the following control operation. However, the control operation as the hardware circuit is replaced with a flowchart for the purpose of facilitating understanding.

First of all, the respective parameters set in the registers 5 are read out (S210). The position controller 72 calculates an error between the target stop position Xt set in the target stop position setting register 51 and the current position Xn of the carriage 31 defined from a count value of the position counter 61 (S220). A manipulated variable Up is generated based on the error using the proportional control (P control) (S230). In this step, the error between the target stop position Xt and the current position Xn is calculated by an adder 72a. Then, the manipulated variable Up is generated for setting "0" to the error, based on the gain (Kp) set in the position control gain setting register 54, by a position controller 72b.

The speed direction corrector 74 determines whether a speed Vp corresponding to the manipulated variable Up generated by the position controller 72 is larger than the target speed Vt set in the target speed setting register 53 (Vp>Vt) (S240). According to the determination, a manipulated variable Uf is newly generated which is obtained by correcting the target speed Vt. Particularly, if the speed value Vp corresponding to the manipulated variable Up is equal to or smaller than the target speed Vt (Vp≦Vt) (S240: NO), the target speed Vt is corrected to the speed value Vp corresponding to the manipulated variable Up and the manipulated variable Up is set to the new manipulated variable Uf (Uf←Up) (S250). Otherwise (Vp>Vt) (S240: YES), the manipulated variable Ut corresponding to the target speed Vt is set to the new manipulated variable Uf (Uf←Ut) (S260).

The reference signal filter 76 generates a speed direction Vf depending on whether the current position of the carriage 31 defined from the count value of the position counter 61 exceeds the deceleration start position set in the deceleration start position setting register 52. Particularly, if the carriage 31 does not pass the deceleration start position (S270: NO), flipping of the switch 76b is performed. The manipulated variable is generated which delays the manipulated variable Uf corrected by the speed direction corrector 74 by the filter 76a (S280). On the other hand, if the carriage 31 does not pass the deceleration position (S270: YES), the flipping of the switch 76b is not performed. The speed corresponding to the manipulated variable Uf corrected by the speed direction corrector 74 is set to the speed direction Vf to the speed controller 78 (S290).

The speed controller 78 calculates an error between the speed direction Vf obtained from the reference signal filter 76 and the traveling speed Vn of the carriage 31 calculated by the speed converter 64 (Vf−Vn) (S300). The speed controller 78 generates a manipulated variable Uo based on the error using the PID control (S310). In this step, the error between the speed direction Vf and the traveling speed Vn is calculated by an adder 78a. Later, the manipulated variable Uo is generated for setting "0" to the error, based on the gain set in the speed control gain setting register 56, by a speed controller 78b.

Subsequently, the PWM generator 8 generates a PWM signal having a duty ratio corresponding to the manipulated variable Uo obtained from the speed Controller 79. The PWM signal, or the braking signal generated by the braking control unit 9, is selected by the selector 10. The CR motor 35 is driven by the PWM signal or the braking signal via the motor driving circuit 4.

Figure 9:
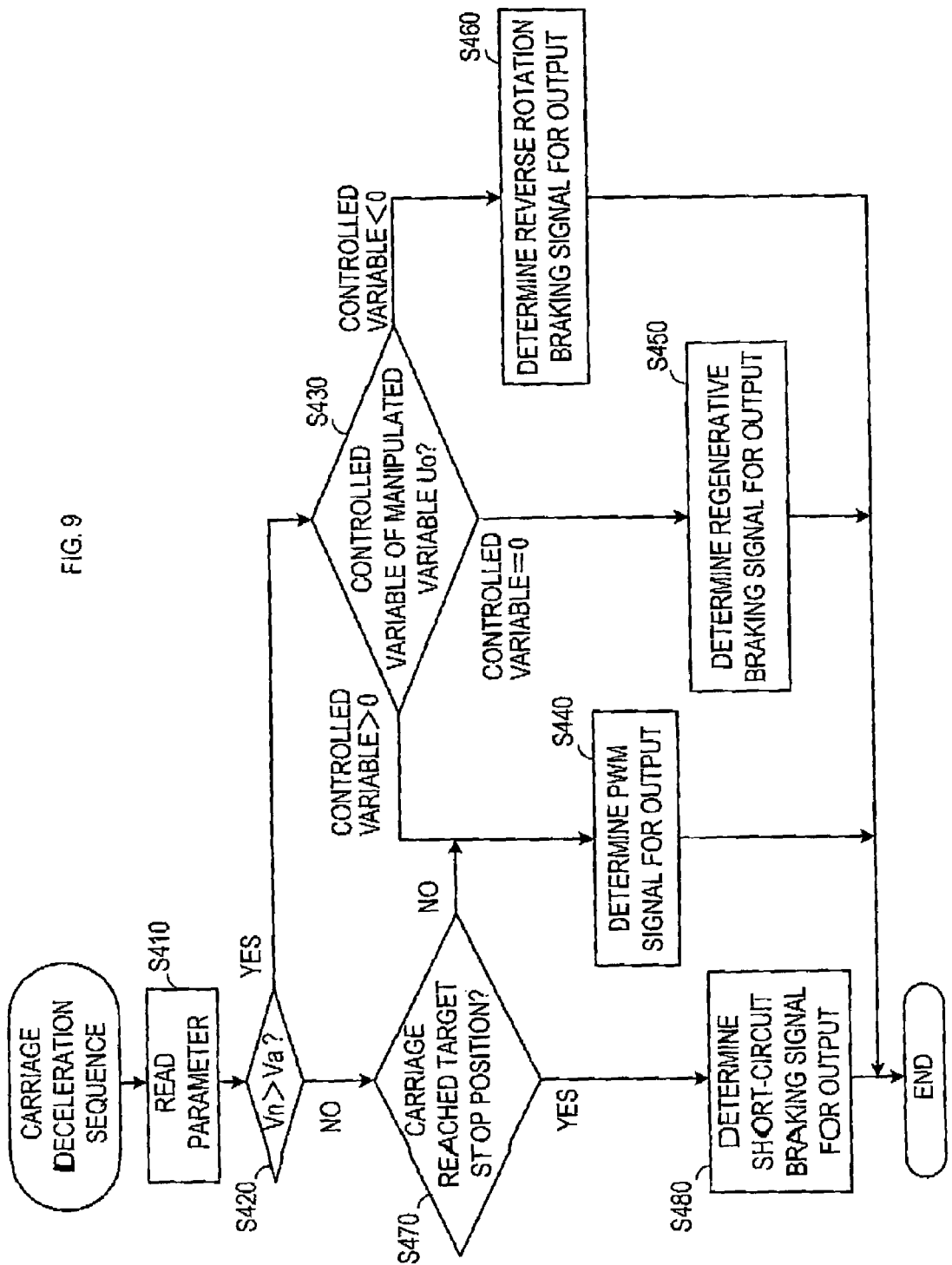
FIG. 9 is a flowchart showing steps in a carriage deceleration sequence of the embodiment.

The following describes a process wherein the selector 10 selects and determines a signal to output to the motor driving circuit 4 based on FIG. 9. This process by the selector 10 is conducted when and after the control switching signal from the drive control unit 7 is inputted, that is, when and after the carriage 31 enters the deceleration section (when and after "YES" determination is made in S270). Before the control switching signal is inputted, the PWM signal generated by the PWM generator 8 is always selected as the signal to be sent to the motor driving circuit 4.

Firstly in S410, a parameter set in the registers 5 (the target stop position set in the target stop position setting register 51) is read.

In S420, it is determined whether or not the traveling speed Vn of the carriage 31 calculated by the speed converter 64 is larger than an estimated speed Va estimated as a predetermined traveling speed of the carriage 31 in the deceleration section. This estimated speed Va is predetermined as a lower speed than the target speed, and as a sufficient speed not to be reduced to zero causing a stop of the carriage 31 even when the traveling speed of the carriage 31 becomes significantly lower than the estimated speed Va (by an undershoot of the traveling speed of the carriage 31) by an influence of braking according to the following process.

In S420, if the traveling speed Vn is determined to be larger than the estimated speed Va (S420:YES), in S430, a controlled variable corresponding to the manipulated variable Uo generated by the speed controller 78 is checked. According to the result of the checking, one of the plurality of braking signals generated by the braking control unit 9 and the PWM signal generated by the PWM generator 8 is selected to be outputted to the motor driving circuit 4.

If the controlled variable corresponding to the manipulated variable Uo generated by the speed controller 78 is positive (S430: controlled variable>0), the PWM signal generated by the PWM generator 8 is selected to be outputted to the motor driving circuit 4 (S440).

If the controlled variable corresponding to the manipulated variable Uo is "0" (S430: controlled variable=0), amongst the braking signals generated by the braking control unit 9, the regenerative braking signal is selected to be outputted to the motor driving circuit 4 (S450). As described above, when the regenerative braking signal is inputted, the motor driving circuit 4 generates a regenerative electric current through the flywheel diodes FD, and this leads to brake the carriage 31 by reducing the rotational speed of the CR motor 35.

If the controlled variable corresponding to the manipulated variable Uo is negative (S430: controlled variable<0), amongst the braking signals generated by the braking control unit 9, the reverse rotation braking signal is selected to be outputted to the motor driving circuit 4 (S460). For example, in the case where the CR motor 35 is rotated in a forward direction by switching on/off the switching elements S1 and S4, the reverse rotation braking signal to switch on only the switching elements S2 and S3 is selected to be outputted. In the case where the CR motor 35 is rotated in a reverse direction by switching on/off the switching elements S2 and S3, the reverse rotation braking signal to switch on only the switching elements S1 and S4 is selected to be outputted. When one of the above reverse rotation braking signals are inputted, the motor driving circuit 4 supplies a drive electric current in a reverse direction as described above, and this leads to brake the carriage 31 by reducing the rotational speed of the CR motor 35.

In S420, if the traveling speed Vn is determined to be equal to or smaller than the estimated speed Va (S420:NO), it is determined whether or not the current position of the carriage 31 defined from the count value of the position counter 61 has reached the target stop position set in the target stop position setting register 51 (S470). If the current position of the carriage 31 has not yet reached the target stop position (S470:NO), the process proceeds to S440. If the current position of the carriage 31 has reached the target stop position (S470:YES), the process proceeds to S480 and the short-circuit braking signal is selected amongst the braking signals generated by the braking control unit 9 to be outputted to the motor driving circuit 4 (S480). In other words, in either cases where the CR motor 35 is rotated in a forward direction, or where the CR motor is rotated in a reverse direction, the short-circuit signal to turn on only the switching elements S2 and S4 is selected to be outputted. When the short-circuit braking signal to switch on only the switching elements S2 and S4 is inputted, the motor driving circuit 4 allows the flow of the electric current generated by the CR motor 35 as described above, and this leads to brake the carriage 31 by reducing the rotational speed of the CR motor 35. Accordingly, the carriage 31 stops at the target stop position, or at a position slightly further than the target stop position (a nearest possible position to an onset of a permissible section for stoppage).

By repetition of the above process, the carriage 31 is moved at a speed following the target speed set in the target speed setting register 53 based on the process shown in FIG. 8 at least until the carriage 31 is passed through the deceleration start position set in the deceleration start position setting register 52. Accordingly, in the acceleration section before reaching the recording start position, the carriage 31 is accelerated so that the traveling speed thereof reaches the target speed, and the carriage 31 is moved at the constant target speed in the constant-speed section. After passing the deceleration start position, the carriage 31 is braked according to the process shown in FIG. 9, and is moved at the target speed corrected based on the error between the target stop position set in the target stop position setting register 51 and the current position of the carriage 31 defined from the count value in the position counter 61. Consequently, the carriage 31 is promptly decelerated in the deceleration section which is beyond the deceleration start position, and is stopped at the target position, or a position slightly beyond the target stop position.

[Effect]

In the printer constituted as above, if the traveling speed Vn of the carriage 31 calculated by the speed converter 64 is larger than the estimated speed Va of the carriage 31 estimated as a predetermined traveling speed in the deceleration section, the carriage control device 1 can conduct braking according to the braking method based on the manipulated variable Uo generated by the drive control unit 7, which is corresponding to the error between target speed Vt and the traveling speed Vn, or the error between the speed Vp (corresponding to the error between the target stop position Xt and the current position Xn) and the traveling speed Vn. Since the above-described estimated speed Va is a predetermined traveling speed in the deceleration section, if the braking in S450 or S460 is conducted after the carriage 31 enters the deceleration section, the traveling speed of the carriage 31 is reduced to the estimated speed Va by the braking within the deceleration section. The braking on the carriage 31 is conducted corresponding to the error between the target speed Vt and the traveling speed Vn, or the error between the speed Vp and the traveling speed Vn. Therefore, even if a braking force necessary to conduct the braking on the carriage 31 differs depending on conditions, such as individual variability of the carriage control device 1 or operative condition of the carriage 31, the braking can be conducted with a braking force suitable for the conditions.

By temporarily reducing the traveling speed Vn of the carriage 31 to the estimated speed Va (see FIG. 3), it is possible to inhibit the carriage 31 from stopping before reaching the target stop position Xt. Moreover, braking to reduce the traveling speed Vn to the estimated speed Va is conducted in a pattern (with a braking force) suitable for the above-described conditions. Consequently, it is possible to shorten the time necessary for the carriage 31 to reach the target stop position Xt.

Furthermore, the braking on the carriage 31 can be conducted by different braking methods depending on whether controlled variable corresponding to the manipulated variable Uo generated by the drive control unit 7 is "0", or negative. Specifically, if the controlled variable corresponding to the manipulated variable Uo is "0", that is, if it is not necessary to drive the carriage 31, the carriage 31 can be braked by the regenerative braking with a small braking force to restrain the carriage from moving by inertia. If the controlled variable corresponding to the manipulated variable Uo is negative, that is, if a driving force to suppress the movement of the carriage 31 is necessary, the carriage 31 can be braked by the reverse rotation braking with a large braking force to drive the carriage 31 in the reverse direction.

Still furthermore, after the traveling speed Vn of the carriage 31 becomes lower than the estimated speed Va, and when the carriage 31 reaches the target stop position, the carriage 31 is stopped by the short-circuit braking (see S480 in FIG. 9). This short-circuit braking is a braking method suitable to instantly stop a plant driven by a motor without rotating the motor reversely. Therefore, it is possible to stop the carriage 31 at the target stop position Xt or a position slightly further than the target stop position.

[Variations]

The above described an embodiment of the present invention. However, the present invention is not limited to the above-described embodiment. Modifications and variations are possible within the scope of the present invention.

For example, in the above-described embodiment, a motor control device of the present invention is applied to the carriage control device 1 of the printer. The motor control device of the present invention can be applied to any other constituent as far as the constituent comprises a device for motor control.

In the above embodiments, the ASIC 3 is used to detect the traveling speed and the position of the carriage 31, and to generate the PWM signal. However, for example, a PLD (Programmable Logic Device) may be used instead.

Furthermore, in the above-described embodiment, if the controlled variable corresponding to the manipulated variable Uo generated by the drive control unit 7 is "0", the regenerative braking is conducted, and if the controlled variable corresponding to the manipulated variable Uo is negative, the reverse rotation braking is conducted. The braking methods are not particularly limited to the above braking methods. Other combination of braking methods or other braking methods can be used as long as one of the braking methods conducted when the controlled variable is negative provides a larger braking force than the braking force based on the other braking method conducted when the controlled variable is "0".

Still furthermore, in the above-described embodiment, the carriage 31 is stopped by the short-circuit braking according to the process of S480 in FIG. 9. Any braking method can be used alternatively as long as the method is suitable to stop the carriage 31.

What is claimed is:

1. A motor control device comprising:
   a motor that drives a plant;
   a detector that detects at least one operation value indicating an operational state of the plant;
   a controller that determines a manipulated variable corresponding to an error between the operation value detected by the detector and a given direction value; and
   a braking device that brakes the plant corresponding to the error between the operation value and the direction value when the operation value detected by the detector is larger than an estimated value estimated as a predetermined operation value in a deceleration section which continues to a target stop position until the plant is stopped.

2. The motor control device as set forth in claim 1, wherein the braking device conducts a braking on the plant by a braking method based on the manipulated variable determined by the controller corresponding to the error between the operation value and the direction value when the operation value is larger than the estimated value.

3. The motor control device as set forth in claim 2, wherein the braking device conducts a braking on the plant by a predetermined first braking method when the operation value is larger than the estimated value and a controlled variable corresponding to the manipulated variable determined by the controller is "0", and conducts a braking by a second braking method that provides a larger braking force than a braking force provided by the first braking method when the controlled variable corresponding to the manipulated variable determined by the controller is negative.

4. The motor control device as set forth in claim 1, wherein the braking device conducts a braking on the plant by a third braking method suitable to stop an operation of the plant when the operational state indicated with the operation value detected by the detector indicates that the plant has reached the target stop position.

5. The motor control device as set forth in claim 1, wherein the detector detects a traveling speed and a current position of the plant as the operation value.

6. The motor control device as set forth in claim 5, wherein
   the direction value is given as a traveling speed suitable for the plant, and
   the braking device conducts a braking on the plant according to an error between the traveling speed as the operation value and the suitable traveling speed as the direction value, if the traveling speed of the plant detected by the detector as the operation value is larger than a predetermined traveling speed estimated as the estimated value in the deceleration section.

7. The motor control device as set forth in claim 5, wherein the braking device uses the current position of the plant detected by the detector as the operation value to determine whether the plant has reached the target stop position, and, when it is determined that the plant has reached the target stop position, conducts a braking on the plant by a third braking method suitable for stopping the operation of the plant.

8. The motor control device as set forth in claim 3, wherein the first braking method is regenerative braking, and the second braking method is at least one of reverse rotation braking and short-circuit braking.

9. The motor control device as set forth in claim 4, wherein the third braking method is short-circuit braking.

10. The motor control device as set forth in claim 7, wherein the third braking method is short-circuit braking.

11. A motor control method comprising steps of:
    detecting at least one operation value indicating an operational state of a plant driven by a motor;
    determining a manipulated variable based on an error between the operation value and a direction value; and
    conducting a braking on the plant according to an error between the operation value and the direction value, if the operation value indicating the operational state of the plant is larger than an estimated value estimated as a predetermined operation value in a deceleration section which continues to a target stop position until the plant is stopped.

12. The motor control method as set forth in claim 11 wherein, in the step of conducting a braking on the plant, a manipulated variable corresponding to the error between the operation value and the direction value is determined if the operation value is larger than the estimated value, and the plant is braked by a braking method based on the manipulated variable.

13. The motor control method as set forth in claim 12 wherein, in the step of conducting a braking on the plant, when the operation value is larger than the estimated value, a braking is conducted on the plant by a predetermined first braking method, if the controlled variable corresponding to the determined manipulated variable is "0", and a braking is conducted on the plant by a predetermined second braking method which provides a larger braking force than a braking force provided by the first braking method if the controlled variable corresponding to the determined manipulated variable is negative.

14. The motor control method as set forth in claim 11 further comprising a step of conducting a braking on the plant by a third braking method suitable for stopping an operation of the plant, if the operational state indicated by the detected operation value is an operational state indicating that the plant has reached the target stop position.

15. The motor control method as set forth in claim 11 wherein, in the step of detecting at least one operation value, a traveling speed and a current position of the plant are detected.

16. The motor control method as set forth in claim 15 wherein
- the direction value is given as a traveling speed suitable for the plant; and
- in the step of conducting a braking on the plant, if the traveling speed of the plant detected as the operation value is larger than a predetermined traveling speed estimated as the estimated value in the deceleration section, the plant is braked according to an error between the traveling speed as the operation value and the suitable traveling speed as the direction value.

17. The motor control method as set forth in claim 15 further comprising a step of determining whether the plant has reached the target stop position using the current position of the plant detected as the operation value and conducting a braking on the plant by a third braking method suitable for stopping an operation of the plant if it is determined that the plant has reached the target stop position.

18. The motor control method as set forth in claim 13 wherein the first braking method is regenerative braking, and the second braking method is at least one of reverse rotation braking and short-circuit braking.

19. The motor control method as set forth in claim 14 wherein the third braking method is short-circuit braking.

20. The motor control method as set forth in claim 17 wherein the third braking method is short-circuit braking.

* * * * *